United States Patent
Virsbreg

[15] 3,702,499
[45] Nov. 14, 1972

[54] METHOD OF MANUFACTURING A COIL

[72] Inventor: Lars-Goran Virsbreg, Vasteras, Sweden

[73] Assignee: Allmanna Svenska Elektriska Aktiebolaget, Vasteras, Sweden

[22] Filed: Feb. 16, 1971

[21] Appl. No.: 115,290

[30] Foreign Application Priority Data

Feb. 24, 1970  Sweden .....................2335/70

[52] U.S. Cl.................29/605, 29/596, 174/DIG. 8, 242/7.03, 336/209
[51] Int. Cl..............................................H01f 7/06
[58] Field of Search.........29/605, 596; 242/4 A, 4 B, 242/7.03, 7.07; 336/209; 174/DIG. 8

[56] References Cited

UNITED STATES PATENTS

| | | |
|---|---|---|
| 3,164,888 | 1/1965 | Sharrow et al...........29/605 X |
| 3,436,815 | 4/1969 | Sheets..........................29/605 |
| 3,559,899 | 2/1971 | Fahrbach.......................242/4 |
| 3,470,046 | 9/1969 | Verdin.................174/DIG. 8 |

Primary Examiner—Charles W. Lanham
Assistant Examiner—Carl E. Hall
Attorney—Jennings Bailey, Jr.

[57] ABSTRACT

A coil having several turns of an insulated conductor is provided with a shrinkage tube of insulating material by producing such relative movement between the conductor and the tube that the end of the conductor passes into the tube and through it a number of times until a portion of all the coil turns is enclosed within the tube. The tube, which may be corrugated to shorten its length during the winding operation, is then heated beginning at one end and expands along and contracts over the wound coil.

11 Claims, 6 Drawing Figures

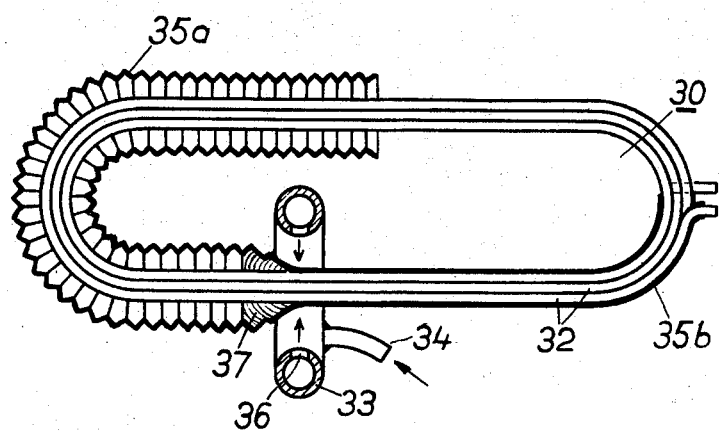
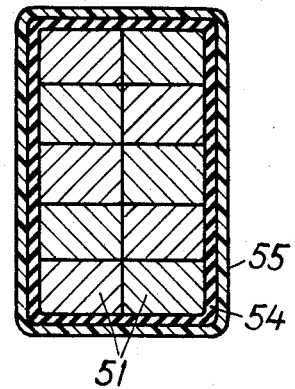

METHOD OF MANUFACTURING A COIL

BACKGROUND OF THE INVENTION

1. Field of the Invention

The present invention relates to a method of manufacturing a coil comprising several several turns of an insulated conductor and provided with at least one layer of insulating material surrounding all the turns, for example high voltage insulation having a dielectric strength of 2,000 volts.

2. The Prior Art

It is known that, instead of insulating a conductor with tape wound on, it is possible to provide the conductor with a so-called shrinkage tube so that an absolutely tight and uniform conductor insulation of high quality can be produced. The expression "shrinkage tube" usually refers to a tube made of insulating material and having the characteristic that a brief heating of the tube causes strong radial contraction of it, for example corresponding to a decrease in the inner diameter of 50 percent. Shrinkage tubes can be obtained in high quality insulating material, for example silicon rubber.

When manufacturing closed coils for high voltage it is usual to use an insulating layer surrounding the coil, as well as conductor insulation providing insulation between the different turns of the coil.

In arranging an insulating layer around a closed coil, it is usual to wind insulating tape around the coil cross-section with a certain amount of overlap. Even if shrinkage tape (which shrinks upon being heated) of, for example, silicon rubber, is used, it is difficult to prevent air from being enclosed between the various layers or turns of the insulating tape and with this method a high quality high voltage insulation requires great accuracy of winding if uniformity and absolute tightness are to be achieved. These disadvantages also apply with insulations of foil material which is placed against the coil surface and attached by winding on a tape, for example as shown in the German Pat. No. 1,221,358.

It is also known to embed a closed coil in epoxy resin or the like. However, this method gives relatively high manufacturing costs, particularly when the manufacturing program covers a considerable number of coils differing in shape and/or size.

SUMMARY OF THE INVENTION

With a method according to the invention the relationship between manufacturing costs and quality is in many cases considerably more favorable than in corresponding known methods.

The invention is characterized in that one such layer consists of a shrinkage tube of insulating material, for example silicon rubber, and that the tube is fitted in expanded state over one end of the conductor and that a continuous relative movement is effected between conductor and tube along a length of conductor corresponding to the sum of the lengths of the various coil turns and that each time such a length has been passed the tube is fitted over said end of the conductor, and that the tube is finally shrunk to exert pressure on the bundle of conductors inside.

According to a further development of the invention a special machine process is used when winding the coil. According to another development a corrugated, almost bellows-shaped shrinkage tube is used so that the heat-treatment used for shrinking the tube also causes a considerable increase in the length of the shrinkage tube. This is an advantage since the stages of the method preceding the heating are easier to carry out with a relatively short shrinkage tube than with a long one. Even if the increase in length achieved by heating is as little as 30 percent it is some help, but it has been found that it is quite easy to obtain an increased length of over 100 percent. Considerable increase in length is of particular importance when the whole coil, or a substantial part of it, say 90 percent, is to be provided with a shrinkage tube. A single coherent shrinkage tube for the whole coil is then to be preferred. By shrinking one end of the tube which overlaps the other, a tight and uniform casing for the coil can be obtained, particularly if the shrinkage tube at the start is manufactured with an opening or openings through which to pass through the connection conductors of the coil. If such is not the case, holes can be made at suitable points and sealed with cured resin or the like, or a special lead-in tube, for example of plastic, can be used, which is provided with a sealing flange arranged inside the shrinkage tube. In some cases a plurality of tubes or tube parts can be used for complete covering of the coil, for example tubes or tube parts arranged one outside the other in expanded condition.

Particularly when the coil is to be insulated for relatively high voltage, for example 3 – 10 kV, it is important to avoid air pockets between the shrinkage tube and the bundle of conductors. In certain cases it may be sufficient to provide an insulating layer of resilient solid material, for example soft rubber, between the bundle of conductors and the shrinkage tube. Still greater safety against air pockets is achieved if instead an insulating material is used which is more or less liquid, at least upon heating.

Especially when using such a liquid material, it is advantageous to carry out the heating required for shrinkage in a special manner, namely by successive heating of the parts of the shrinkage tube immediately adjacent each other in the longitudinal direction of the tube to full shrinkage. If the above-mentioned insulating material, for example in the form of a viscous paste is supplied — at least in the initial stage of the heat treatment — in a quantity per unit of length of the coil circumference which is greater than that intended for the finished coil, the progressive heating along the coil will result in a ridge of liquid insulating material being forced in front of the shrinkage zone so that the occurrence of air pockets is prevented. The liquid insulating material may be applied just before heating is initiated, or at a relatively early stage, for example by coating the bundle of conductors or the shrinkage tube with a curable resin which solidifies some time after being sprayed on and which first melts and then hardens upon being heated.

Besides the favorable effect mentioned above, heating the coil along a successively displaced heating zone has the advantage that the shrinkage tube is stretched more satisfactorily in its longitudinal direction, which is of particular importance when a corrugated shrinkage tube is used. In such cases it may be advisable to subject the shrinkage tube to a reasonable tractive force at the same time that the progressive heating is taking place.

BRIEF DESCRIPTION OF THE DRAWINGS

In the following the invention will be described with reference to the accompanying drawings in which FIGS. 1a and 1b show two alternatives of a cross-section through A—A in FIG. 1.

FIG. 3 shows a means for heating a shrinkage tube arranged on a coil and

FIG. 4 shows in cross-section a coil side provided with a soft rubber layer between the conductor bundle and the shrinkage tube.

DESCRIPTION OF THE PREFERRED EMBODIMENT

Figure 1:
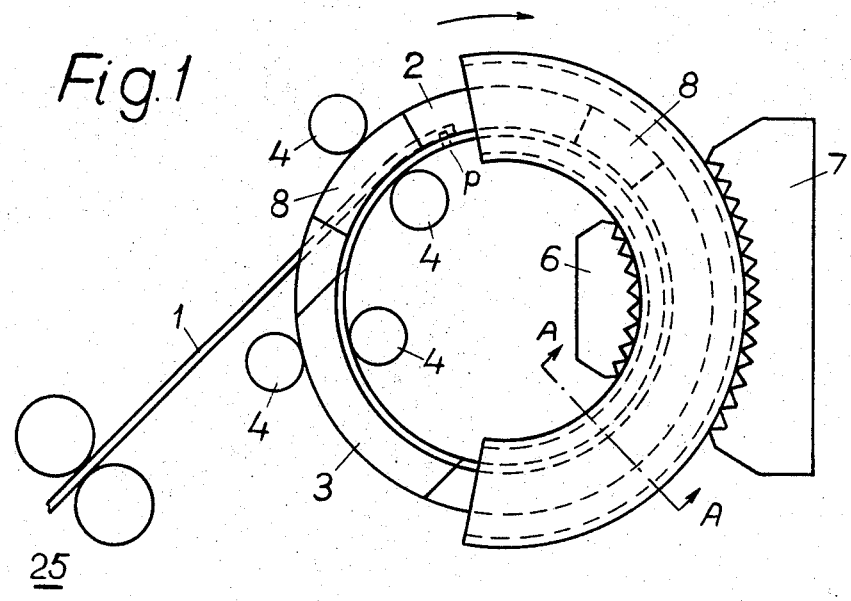
FIGS. 1, 1a and 1b illustrate a process according to one form of the invention, and FIG. 2 a method according to another form.
Figure 1A:
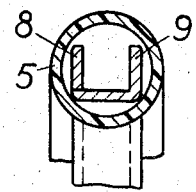
Figure 1B:
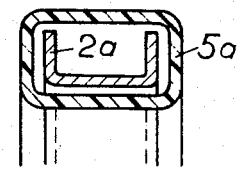

In FIG. 1, 1 designates an insulated conductor having circular or rectangular cross-section. One end of the conductor can be attached to the circular frame 2 at a point P at the bottom of a peripherally running L-shaped groove. The frame 2 has a removable part 3. The frame 2 is arranged to be able to rotate under the influence of a number of driving rollers 4, for example of rubber. A shrinkage tube 5 is held in position between a pair of tube-holders 6 and 7. 25 is a tensioning means through which the conductor 1 is pulled when being coiled on to the frame 2.

With a method according to the invention, carried out with the help of the device shown in FIG. 1, the circular frame 2 is first opened by removing the detachable part 3. Then the shrinkage tube is threaded onto the frame 2 and clamped between the jaws 6 and 7, the frame part 3 is put in place and the conductor 1 attached by one end at point P, after which the frame 2 is rotated and the conductor 1 is coiled on to the frame 2. When the desired number of coil turns has been wound on to the frame, the frame part 3 is again removed and also the guide parts 8 which are arranged parallel to the flange 9 and fixed by means of radially directed screw bolts during the coiling process. It is now easy to remove the frame 2 from the coil and the shrinkage tube.

In certain cases, for example when the finished coil is to be shaped with small radii of curvature, for example as a rectangular coil with relatively sharp corners, it may be advantageous first to make the coil with a different shape, for example circular, with the shrinkage tube in position but not shrunk. If the coil shape is not the same as in the intended final product, this is achieved by drawing and/or pressing in the radial direction so that the coil is shaped as desired. Thereafter the shrinkage tube (or tubes) is adjusted to the desired position and subjected to the heat-treatment required for shrinkage.

Figure 2:
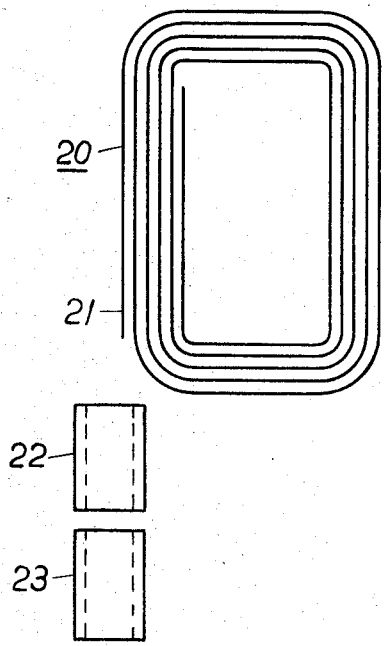

In FIG. 2, 20 designates a coil which is wound from an insulated conductor 21. The coil is provided at two different points along the circumference of the coil with a surrounding insulating layer by two shrinkage tubes 22 and 23 being threaded on to the same end of the conductor and then passed continuously along the entire length of the conductor. Each time a distance equal to the turn length is passed by a shrinkage tube, the conductor end is again threaded into the tube.

FIG. 3 shows a coil insulated according to the invention at a stage in the manufacture when the final heat-treatment has been started but not completed. Part of the shrinkage tube 35b fits tightly around the conductor bundle formed of a plurality of coil turns 32, while the rest of the shrinkage tube, 35a, has not yet been subjected to the necessary heat-treatment. The shrinkage tube is corrugated and intended to cover the coil completely when the heating treatment has been completed. The heating is carried out with the help of a hollow ring 33 with an inlet opening 34 and radially inwardly directed outlet openings 36 for hot air. The ring 33 is passed along the circumference of the coil at a substantially constant speed. A viscous insulating material has been inserted in the space between the shrinkage tube and the coil before the heat-treatment was started, and in such a quantity that a ridge 37 of excess material is pressed before the heating zone all the time.

In certain cases the time required for the heat-treatment can be reduced by using instead of the heating means shown in FIG. 3 a narrow hot air zone covering the total width of the coil and feeding the coil into the zone by one end so that the central part of the shrinkage tube is heated first and two shrinkage zones then move towards opposite ends of the shrinkage tube and towards the same end of the coil.

In FIG. 4, 55 designates a heated and shrunk shrinkage tube which, together with a layer 54 of relatively soft rubber lying inside, encloses a bundle of conductors 51, each belonging to a corresponding turn of a coil manufactured in the manner described in connection with FIG. 1.

A method according to the invention can be used for manufacturing coils for many different purposes in the field of high current, for example transformer coils and stator and rotor windings for synchronous and asynchronous machines.

As mentioned, shrinkage tubes of known and commercially available type are shrunk by means of heating. In theory a shrinkage tube operating according to other physical principles is possible, for example in the form of a thin-walled, stiff tube in combination with an extremely elastically deformed rubber tube, the shrinkage being effected by destruction of the stiff tube. If, for example, this is a tube of toughened glass, the destruction may be carried out mechanically and if it consists of hard plastic, this may be softened with the help of a suitable solvent. The use of such types of shrinkage tubes is considered to lie within the scope of the invention.

In both the methods described there is effected such relative movement between the first end of the conductor and the sleeve along a length of conductor corresponding to the perimeter of the coil and thereafter the tube is again fitted over the end of the conductor and the relative movement is repeated until portions of all the turns of the conductor are enclosed in the sleeve.

I claim:

1. Method of manufacturing a coil (20) comprising several turns of an insulated conductor (1, 21) and provided with at least one layer of insulating material surrounding all the turns, in which such layer consists essentially of a shrinkage tube (5) of insulating material, which comprises fitting the tube in expanded state over one end of the conductor and effecting a continuous relative movement between conductor and tube along a length of conductor corresponding to the length of a coil turn, and after each time a coil turn length has been passed fitting the tube over said end of the conductor and effecting such relative movement successively until the tube encloses a portion of all of the coil turns, and shrinking the tube to exert pressure on the bundle of conductors inside.

2. Method according to claim 1, which comprises fitting the shrinkage tube (5) over a frame (2) located in a plane and having an opening intended therefor, and attaching said conductor end to the frame, giving the frame a rotary movement in said plane in such a way that the conductor is wound with several turns on the frame while at least partially limiting the movement of the shrinkage tube in said plane, removing the shrinkage tube from the frame by displacing it along the enclosed bundle of conductors and through said opening, and removing the coil with the surrounding shrinkage tube from the frame.

3. Method according to claim 1, which comprises coiling said conductor (21) to form the desired number of turns, and thereafter producing such relative movement between shrinkage tube (22) and conductor.

4. Method according to claim 1, in which said shrinkage tube in expanded state is corrugated, whereby when the corrugation is flattened out during shrinkage an increase in length is produced.

5. Method according to claim 1 in which the final shrinking of the shrinkage tube comprises a progressive shrinking in the longitudinal direction of the shrinkage tube.

6. Method according to claim 1, which comprises positioning a layer of yielding insulating material between the coil and the shrinkage tube before shrinking the tube.

7. Method according to claim 1, which comprises introducing an insulating material which is liquid at a temperature lower than or equal to the maximum temperature of the shrinkage tube during shrinking into the shrinkage tube before shrinking.

8. Method according to claim 7, in which said liquid insulating material is supplied, at least at the first part of the shrinkage tube to be shrunk, in a quantity per unit length of the coil side greater than the average unit quantity intended for the completely insulated coil, and producing progressive contraction of the tube to effect final distribution of this insulating material along the circumference of the coil.

9. Method according to claim 1, in which the shrinkage tube in shrunk state surrounds at least 90% of the coil circumference.

10. Method according to claim 1, which comprises applying a plurality of shrinkage tubes arranged along the coil circumference without contact with each other.

11. Method according to claim 1, which comprises applying a plurality of shrinkage tube portions initially and in expanded condition arranged one outside the other with a relatively high degree of overlapping, and substantially reducing the overlapping prior to the final shrinking.

* * * * *

UNITED STATES PATENT OFFICE
CERTIFICATE OF CORRECTION

Patent No. 3,702,499          Dated November 14, 1972

Inventor(s)  Lars-Goran Virsberg

It is certified that error appears in the above-identified patent and that said Letters Patent are hereby corrected as shown below:

The inventor's last name is changed from "Virsbreg" to -- Virsberg --.

Signed and sealed this 8th day of May 1973.

(SEAL)
Attest:

EDWARD M. FLETCHER, JR.　　　　　　ROBERT GOTTSCHALK
Attesting Officer　　　　　　　　　　Commissioner of Patents